June 25, 1935.    A. POTIGIAN    2,006,111
ANIMAL TRAP
Filed Jan. 16, 1935    2 Sheets-Sheet 1
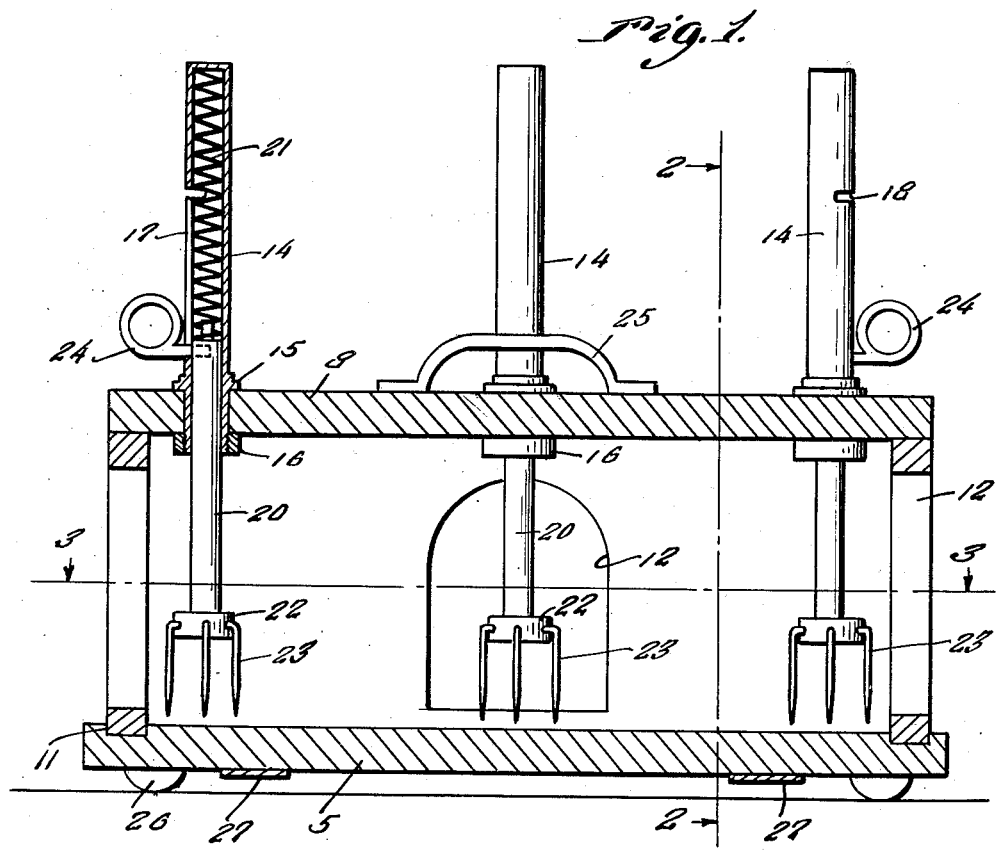
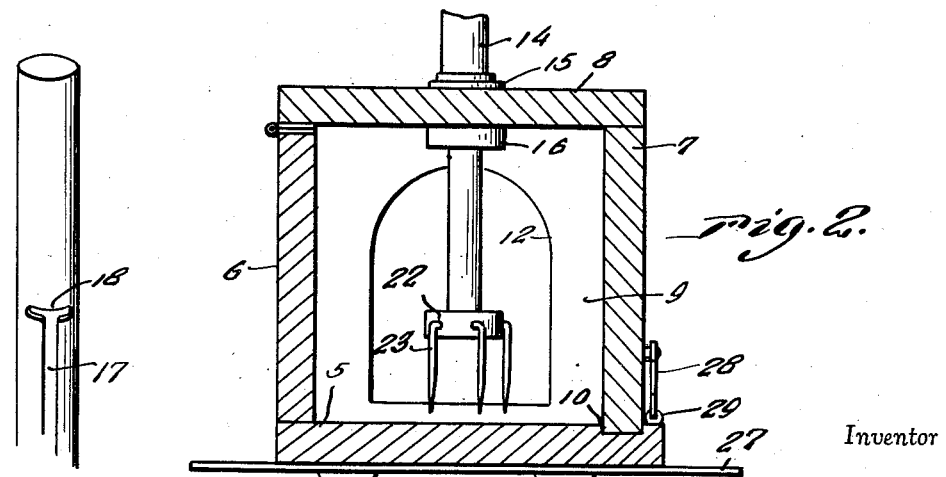
Inventor
Armen Potigian
By Clarence A. O'Brien
Attorney June 25, 1935.  A. POTIGIAN  2,006,111
ANIMAL TRAP
Filed Jan. 16, 1935   2 Sheets-Sheet 2

Inventor

*Armen Potigian*

By *Clarence A. O'Brien*
Attorney

Patented June 25, 1935

2,006,111

UNITED STATES PATENT OFFICE 2,006,111

ANIMAL TRAP

Armen Potigian, Davenport, Iowa

Application January 16, 1935, Serial No. 2,127

3 Claims. (Cl. 43—79)

The present invention relates to an animal trap which is designed for use in trapping large and small animals of any kind, such as the wolf, fox, rat, etc.

An important object of the invention resides in the provision of a trap of this nature provided with means which holds the bait and when the animal attempts to take the bait therefrom said means kills the animal in an effective and humane manner.

Another very important object of the invention resides in the provision of a trap of this nature which is comparatively simple in its construction, inexpensive to manufacture, thoroughly efficient and reliable in use, easy to manipulate and otherwise well adapted to the purpose for which it is designed.

With the above and numerous other objects in view as will appear as the description proceeds, the invention consists in certain noved features of construction, and in the combination and arrangement of parts as will be hereinafter more fully described and claimed.

In the drawings:

Figure 1 is a vertical central longitudinal section through the trap embodying features of my invention.

Figure 2 is a vertical transverse section therethrough taken substantially on the line 2—2 of Figure 1.

Figure 5 is a detailed perspective view showing one end of the tube.

Figure 3:
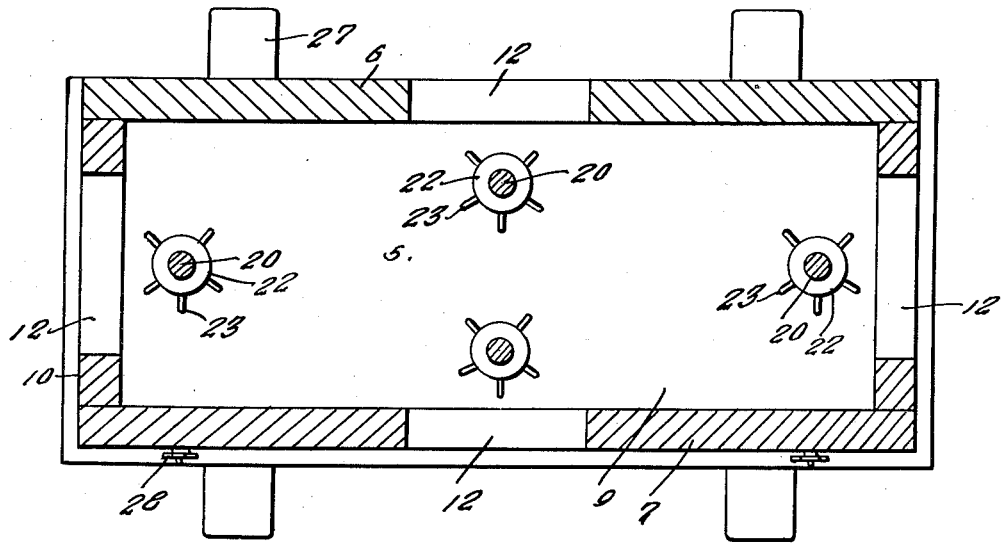
Figure 3 is a horizontal section taken substantially on the lne 3—3 of Fgure 1.
Figure 4:
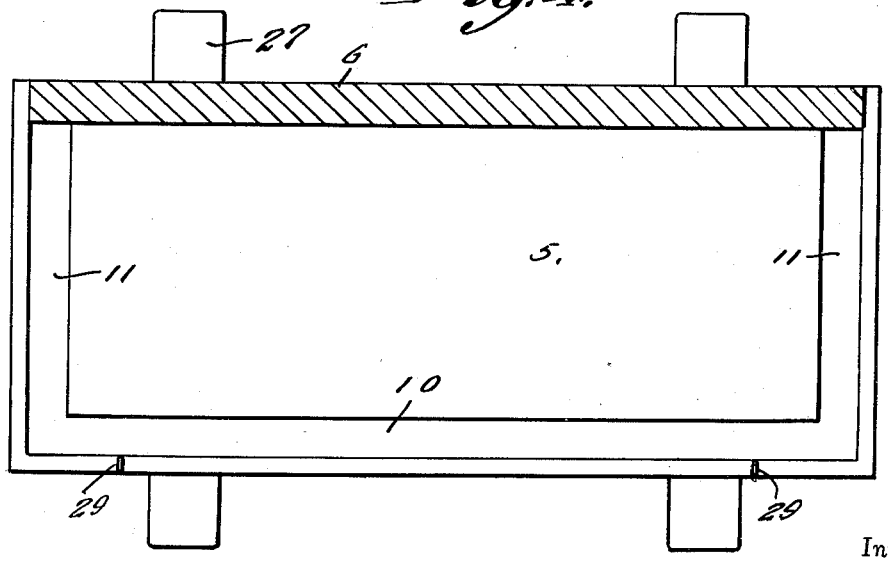
Figure 4 is a similar section but showing one of the sections of the device removed or raised.

Referring to the drawings in detail it will be seen that I provide a box-like structure or casing which is formed in two sections. One section includes a bottom 5 with a side wall 6 rising therefrom and fixed thereto. The other section comprises a side wall 7, a top 8 to which said side wall is fixed, and a pair of end walls 9. The bottom is provided with a longitudinal groove 10 and transverse grooves 11—11 for receiving respectively the lower edges of the side wall 7 and the end walls 9—9. The walls, 6, 7 and 9—9 are provided with entrance openings 12.

Tubes 14 extend through openings in the top 8 and are anchored in place by annular shoulders 15 formed thereon and nuts 16 threadedly engaged therewith as clearly shown in Figure 1. The upper ends of these tubes are closed. Intermediate portions of the tubes are provided with longitudinally extending slots 17 the upper ends of which are provided with lateral branches 18. Shanks 20 are slidable in the tubes and springs 21 in the tubes impinge downwardly against the upper ends of the shanks. The lower ends of the shanks are provided with heads 22 from which extend downwardly disposed prongs 23. Handles 24 are provided on the upper ends of the shanks and extend through slots 17. These handles may be moved up against the tension of the springs 21 until the handles may be moved laterally into the branches 18. The bait is placed on the prongs 23. It will be noted that there is a shank and head located opposite each one of the entrances 12.

A handle 25 is provided on the cover panel 8. Feet 26 are provided on the bottom 5. Plates or bars 27 extend transversely under the bottom side and are fixed thereto and extend out beyond the side edges thereof so that suitable means may be used for anchoring the trap to the ground. When the trap is properly set with the upper section closed down on the lower section and catches 28 engaged with eyes 29 and the handles 24 are in a raised position and the bait is on the prongs 23 it will be seen that an animal entering one of the entrances reaches up to contact with the bait and in his effort to get the bait will cause a slight turning movement of the shank 20 so as to swing the handle 24 so that it is free to go down the slot 17 through the action of spring 21.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described the invention, what is claimed as new is:

1. A trap of the class described comprising a box-like structure, a plurality of tubes mounted in the upper portion of the box-like structure, shanks slidable in the tubes, springs in the tubes impinged against the shanks to force them downwardly, heads on the lower ends of the shanks, prongs on the heads, said tubes having longitudinally extending slots terminating at their upper ends in lateral branches, and a handle extending from the upper end of the shank through the slots and engageable in the branches, said box-like structure comprising two sections, one section including a bottom with a side wall fixed thereto and rising therefrom, the other section comprising a top panel through which the tubes extend, a side wall fixed to the top panel, and end walls fixed thereto, the bottom being provided with grooves to receive the lower edges of the end walls and the side wall of the upper section, the top panel being hinged to the first mentioned side wall, and means for engaging the second mentioned side wall with the bottom to prevent accidental opening of the box, the walls of the box being provided with entrance openings.

2. A trap of the class described comprising a box-like structure, a plurality of tubes mounted in the upper portion of the box-like structure, shanks slidable in the tubes, springs in the tubes impinged against the shanks to force them downwardly, heads on the lower ends of the shanks, prongs on the heads, said tubes having longitudinally extending slots terminating at their upper ends in lateral branches, a handle extending from the upper end of the shank through the slots and engageable in the branches, said box-like structure comprising two sections, one section including a bottom with a side wall fixed thereto and extending upwardly therefrom, the other section comprising a top panel with a side wall fixed thereto, said top panel having the tubes extending therethrough, and end walls fixed to said last named section of the box-like structure, said side and end walls being provided with entrance openings.

3. A trap of the class described comprising a box-like structure, a plurality of tubes mounted in the upper portion of the box-like structure, shanks slidable in the tubes, springs in the tubes impinged against the shanks to force them downwardly, heads on the lower ends of the shanks, prongs on the heads, said tubes having longitudinally extending slots terminating at their upper ends in lateral branches, a handle extending from the upper end of the shank through the slots and engageable in the branches, said box-like structure comprising two sections, one section including a bottom with a side wall fixed thereto and extending upwardly therefrom, the other section comprising a top panel with a side wall fixed thereto, said top panel having the tubes extending therethrough, and end walls fixed to said last named section of the box-like structure, the bottom being provided with grooves to receive the lower edges of the end walls and the side wall of the upper section, said side and end walls having entrance openings therein.

ARMEN POTIGIAN.